June 1, 1943.  W. J. DOELKER  2,320,573
METHOD FOR HARDENING METALS
Filed May 22, 1941

William J. Doelker
Inventor
By Earl Beust
His Attorney

Patented June 1, 1943

2,320,573

UNITED STATES PATENT OFFICE 2,320,573

METHOD FOR HARDENING METALS

William J. Doelker, Dayton, Ohio, assignor to The National Cash Register Company, Dayton, Ohio, a corporation of Maryland Application May 22, 1941, Serial No. 394,692

3 Claims. (Cl. 148—10)

This invention relates to a method and means for hardening the cutting lands of an external screw thread cutting die.

In hardening by heat treating the thread cutting parts of such a die, commonly termed a button die, trouble has heretofore been encountered, inasmuch as it has been necessary, in order to heat the lands, to heat the whole die, with a consequence that the heavy periphery thereof had a tendency to warp and cause the cutting surfaces of the die to move out of alinement.

This invention discloses a method and means for quickly heating the lands of such a die without materially heating the periphery thereof, high frequency induction heating being employed, using a special coil particularly shaped to be entered into and positioned properly within the clearance holes of the die so that the lands lie within the coil.

Therefore, it is the principal object of this invention to provide a method for the hardening of the lands of an external screw thread cutting die by means of high frequency induction heating.

Another object of the invention is to provide an induction heating coil particularly adapted to heating the lands of an external screw thread cutting die without heating the periphery of the die.

With these and incidental objects in view, the invention includes certain novel features, the essential elements of which are set forth in appended claims and a preferred form or embodiment of which is hereinafter described with reference to the drawing which accompanies and forms a part of this specification.

Figure 1:
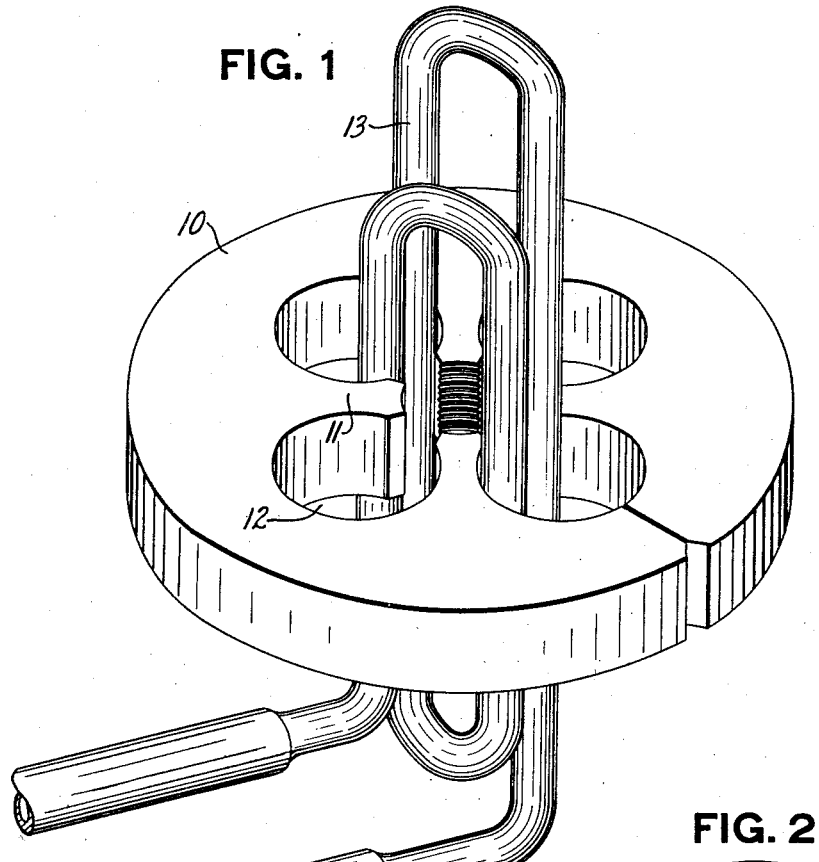
Fig. 1 is a perspective view of a typical "button" type external thread cutting die with the novel high frequency induction heating coil in place for the heating of the lands.

The "button" die illustrated in Fig. 1 is typical of those used for cutting external threads on screws and consists of a periphery 10, four inwardly extending lands 11 having cutting surfaces on their inner ends, and four clearance holes 12 intermediate the lands.

The clearance holes 12 afford room for the insertion of the novel induction heating coil 13, formed of two turns of hollow electric conducting tubing, the coils being so wound in a helical spiral, preferably flattened laterally as shown, so that two of the clearance holes 12 diametrically opposite can be utilized to accommodate said coils in the manner shown in Fig. 1, the thread cutting portions of the lands thereby being disposed within the internal heat zone of the coil, said internal zone of the coil being energized to a much greater degree than the external zone of the coil, thus causing a great differential between the applied heat on the lands as compared with the periphery.

Figure 2:
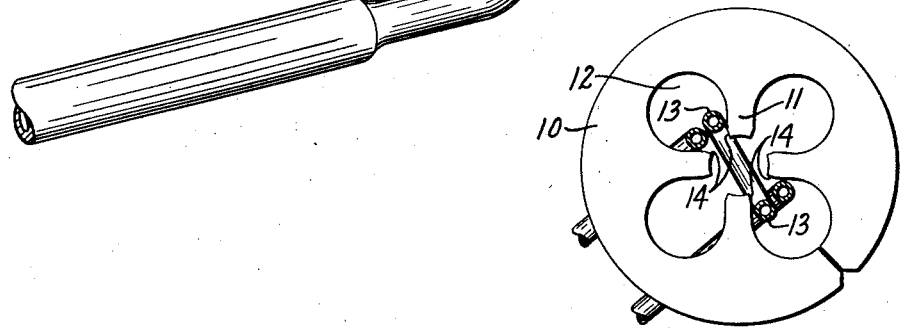
Fig. 2 represents a section through the coil of Fig. 1 above the die and on a plane perpendicular to the axis of the die.

It is to be noted that one of the turns of the coil, having a greater long diameter than the other turn, permits the two turns of the coil to be manipulated by compression and side displacement of adjacent turns of the coil, one side at a time, so as to be insertable into the associated clearance holes by way of the passages 14 (Fig. 2). The coil, by its natural resilience, returns to normal shape after the manipulation and is therefore disposed within the clearance slots as best illustrated in Fig. 2, wherein it is shown that the turns of the coil do not touch one another or the lands of the die, but are positioned symmetrically in relation thereto. By the above-described method of inserting the elongated coil, it is so positioned that all four of the lands are equally within the internal heating zone of the coils and receive equal and intense heating as compared with the periphery of the die, which is relatively distantly located in the outer heating field of the coil, thus resulting in concentrating the heating effect of the coil on the lands and particularly on the inner ends thereof.

After the coil is inserted as shown, a high frequency current is passed through the coils for the required time according to the kind of metal, the size of the die, and other factors necessary to consider to secure proper induction heating. After the required heating is accomplished, the current is shut off, the die is quenched by water or other cooling agent, and the coil is removed by reversing the movements by which it was inserted.

By the above described means, the thread cutting parts of the die are hardened, and the periphery of the die is left in its original shape and toughness without warping or misalining the cutting lands.

The coils may be made of the diameter tubing and of the proper tightness of coiling as best suit the size of the die and the size of the clearance holes.

While the method and means herein disclosed and described are admirably adapted to fulfill the objects primarily stated, the invention is not to be limited to the form of embodiment herein disclosed, for it is susceptible of embodiment in various forms all coming within the scope of the claims which follow.

What is claimed is:

1. A method of hardening the lands of a button type external screw thread cutting die without hardening the periphery of said die, including the insertion of a coil within the clearance slots between the lands of the die, the said coil having its turns symmetrically positioned with respect to the lands so that each land is in an equivalent heating zone of the internal field of said coil and the periphery of the die is in the external field of the coil; the step of energizing said coil whereby the lands in the internal field are quickly heated, leaving the periphery of the die in the external field relatively cool; and the step of quenching the die after the proper temperature for the lands has been reached.

2. The method of heat treating the lands of a button type external screw thread cutting die without heating the periphery thereof, including the steps of positioning a high frequency induction heating coil within the clearance holes of said die so that each land will be disposed in the internal field of the coil of the same intensity and so that the periphery of said die will be positioned in the external field of said coil in a greatly reduced heating area of said field; the step of applying high frequency energy to the said coil whereby the lands are completely and equally heated without the periphery of said die being affected by the heat; and the step of de-energizing the coil and quenching the die when the lands have obtained the proper temperature.

3. The method of hardening the internal lands of an external screw thread cutting die, including the step of positioning a high frequency induction heating coil in a plane including the axis of the die and a line joining diametrically opposite clearance holes of the die, the turns of said coil being passed through the clearance holes symmetrically to the lands adjacent said clearance holes; the step of energizing the coil to produce the proper heating of the lands; and the step of quenching the die.

WILLIAM J. DOELKER.